United States Patent [19]

Stephenson

[11] Patent Number: 6,072,563
[45] Date of Patent: Jun. 6, 2000

[54] PRINTER APPARATUS FOR SIMULTANEOUSLY PRINTING MULTIPLE IMAGES

[75] Inventor: Stanley W. Stephenson, Spencerport, N.Y.

[73] Assignee: Eastman Kodak Company, Rochester, N.Y.

[21] Appl. No.: 08/824,696

[22] Filed: Apr. 8, 1997

[51] Int. Cl.[7] .................................................. G03B 27/58
[52] U.S. Cl. ............................. 355/74; 355/67; 355/40; 355/27
[58] Field of Search .................................. 355/27, 40, 28, 355/29, 41, 42, 43, 50, 114, 127, 89

[56] References Cited

U.S. PATENT DOCUMENTS

| | | |
|---|---|---|
| 3,177,763 | 4/1965 | Franqui ........................................ 355/40 |
| 3,953,869 | 4/1976 | Wah Lo et al. ........................... 354/115 |
| 4,095,892 | 6/1978 | Thornton ................................... 355/741 |
| 4,959,683 | 9/1990 | Otaka et al. ............................... 355/28 |
| 5,049,936 | 9/1991 | Meyers ..................................... 355/232 |
| 5,274,418 | 12/1993 | Kazami et al. ........................... 355/40 |
| 5,452,050 | 9/1995 | Ishikawa et al. ......................... 355/27 |
| 5,639,172 | 6/1997 | Erickson .................................. 402/79 |
| 5,801,814 | 9/1998 | Matsumoto ............................... 355/40 |

*Primary Examiner*—Georgia Epps
*Assistant Examiner*—Timothy Thompson
*Attorney, Agent, or Firm*—Raymond L. Owens

[57] ABSTRACT

Printer throughput is increased in a printer that prints sequential images on a film strip onto a matching strip of photosensitive printing paper. A film gate supports two or more images on the film strip. An illuminator provides light to the images in the film gate. An optics system focuses the film images onto separable areas of the printing paper and a shutter over each printing area individually exposes the printing areas.

4 Claims, 4 Drawing Sheets

6,072,563

PRINTER APPARATUS FOR SIMULTANEOUSLY PRINTING MULTIPLE IMAGES

FIELD OF THE INVENTION

The present invention relates to simultaneously printing multiple images on printing paper.

BACKGROUND OF THE INVENTION

Photographic cameras capture a series of images on strips of sensitized film. After exposure, the film strip is chemically processed to develop stable negative images on the film. These film strips are passed through a printer that serially focuses each image onto a matching area on a strip of photosensitive paper. Each image is pre-analyzed for density and color balance, and the exposure of the film image onto the paper is controlled to correct for errors in film density and film color balance.

U.S. Pat. No. 5,274,418, Kazami et al discloses an arrangement for printing a plurality of images from a film strip onto a roll of photosensitive paper. A series of single images on the film strip are printed to print paper. The paper is moved for each successive negative so that a series of images on the film strip are sequentially formed in various areas of a frame on the paper. U.S. Pat. No. 4,959,683 to Otaka et al operates on a unitary negative to create separate prints from various areas of the negative. Both patents do not increase print speed and require an exposure series of individual exposures. U.S. Pat. No. 4,095,892 discloses separable shuttering arrangement for an image receiving sheet. No method of advancing paper or image strips is disclosed.

It is, of course, highly advantageous to be able to simultaneously print multiple images, each of which has the correct density and color balance.

SUMMARY OF THE INVENTION

It is an object of the present invention to simultaneously print high quality multiple images on printing paper.

It is another object of the invention to simultaneously print multiple images on printing paper so as to increase printer throughput without degradation to image quality.

This object is achieved by apparatus for simultaneously illuminating a plurality of images from a film strip at an illumination gate onto different positions of printing paper, comprising:

a) means for transporting a film strip having a plurality of images to the image gate wherein a plurality of images are to be illuminated;

b) illumination means for illuminating images in the film gate;

c) an optics system for focusing the illuminated film images onto separable areas of the printing paper; and d) separate exposure control means for each image to be formed on the printing paper which are separately operable to control the amount of illumination of the film images.

ADVANTAGES

This invention provides for an increase in printing speed by permitting two or more images on a film strip to be printed simultaneously. In one embodiment, common illumination source and common optic are used to illuminate and focus both images simultaneously. The simultaneous printing offers a substantial increase in throughput of a printer.

DETAILED DESCRIPTION OF THE INVENTION

The invention is directed to a printer transferring images from a film strip 16 to a strip of print paper 17. Images are taken as a series of frames on a length of sensitized film. The strips are chemically processed to develop stable negative images of captured scenes. These film strips are fed into printer 10 which create positive image prints on print paper 17 such as photographic paper.

In prior art arrangements, the film strip 16 moves in a path through the printer. A pre-scanning station (not shown) measures the density and color balance of each image. The negatives are advanced into an exposure station. A single image is illuminated and projected onto an area of the paper strip. A series of shuttering filters are used to control the exposure of the negative image on the strip to create a positive, enlarged image on the paper. The exposure and filtering times for each negative is individually controlled according to the pre-measured values to create an acceptable print on the paper.

Figure 1:
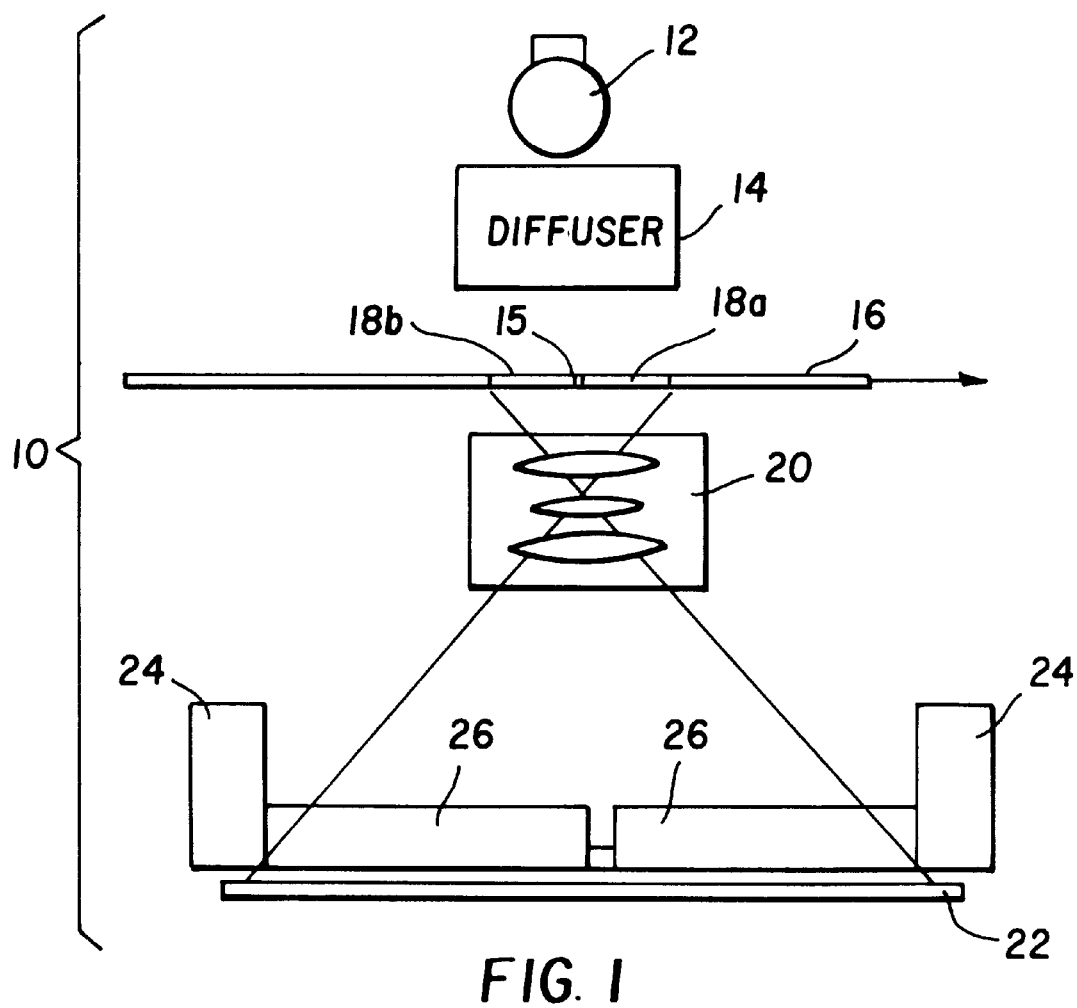
FIG. 1 is a front schematic view of the printer in accordance with the present invention.

FIG. 1 shows an improved printer 10. Film strip 16 carries a plurality of images that have been analyzed for density and color balance. In this embodiment, two images, 18a and 18b are brought into an exposing gate 15. Lamp 12 provides illumination that passes through a diffuser 14 to evenly illuminate film images 18a and 18b. Focusing optic 20 is used to focus a plurality of images on the paper surface. In this disclosed embodiment, two images are simultaneously projected onto the paper.

Figure 2:
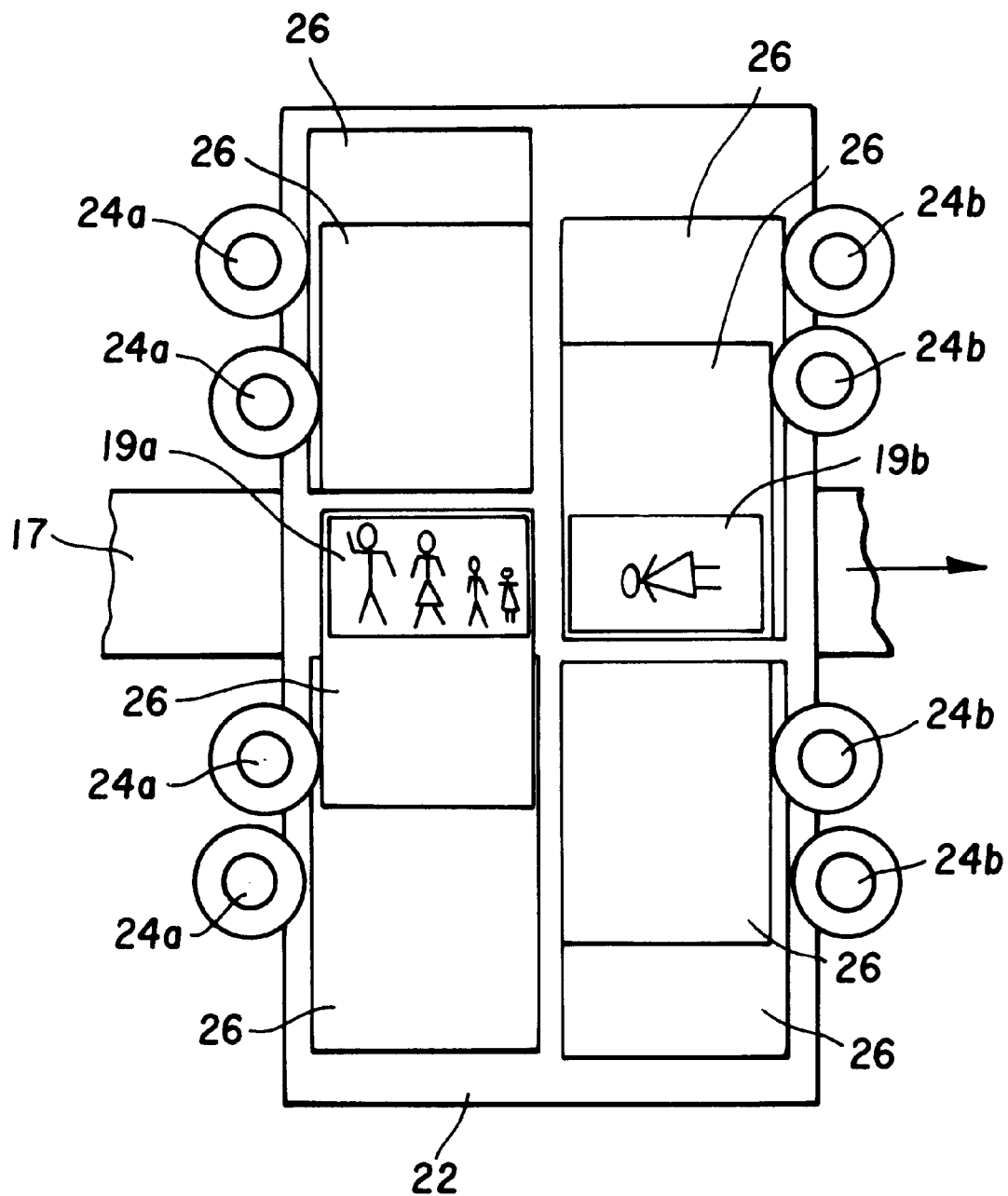
FIG. 2 is a top sectional view over the exposure control arrangement for the printing paper in FIG. 1.

FIG. 2 shows a top sectional view of the printer, particularly showing the exposure control system in the printer 10. In fact, there are two exposure control arrangements which are separably operable, one for each image to be formed on the print paper 17. Print paper 17 travels under a shutter support 22. Shutter support 22 has openings that frame print images 19a and 19b that correspond to film images 18a and 18b respectively. A series of shutters 24a and 24b carry filters for exposure control of image a and image b. Shutter drivers 24a and 24b are disposed to drive shutters 26 into either a covering or uncovering position over print images 19a and 19b respectively. Alternatively, two separate color liquid crystal shutters can be disposed over print images 19a and 19b. The use of two separate shuttering/filtering systems permits separate control of exposure of two images.

Figure 3:
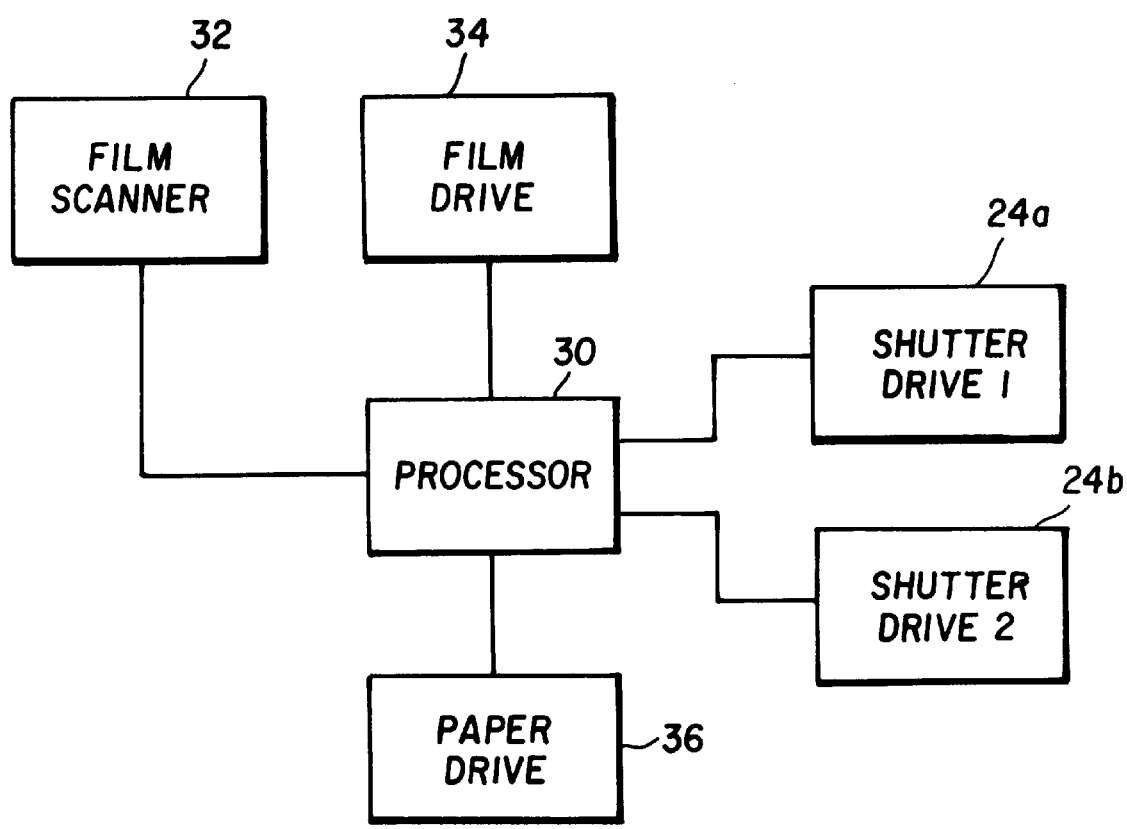
FIG. 3 is a schematic of the control electronics according to the present invention.

FIG. 3 is a schematic of the electronic system used to control the printer 10. A processor 30 receives data from a film scanner 32. Paper and film motion are controlled by paper drive 36 and film drive 34, respectively. When the film strip and paper are aligned, processor 30 operates on shutter drivers 24a and 24b separately to control exposure of images a and b.

In operation, film strip 16 is advanced two images per cycle. The images are pre-scanned to determine exposure and color balance values for each individual image. The set of images is advanced into the printing station while shutters 26 cover print paper 17. Shutter drivers 24a and 24b are then operated to individually expose print images 19a and 19b according to individual predetermined exposure schedules. In operation, the time required to print the darkest negative will determine the print time for both images. The print time saved is equal to the faster print time of the two images. In practice, most pairs of images have approximately equal exposure, thus the printing time is nearly halved.

After exposure, shutters 26 have covered print images 19a and 19b. The paper is advanced a distance equivalent to the length of print images 19a and 19b. Simultaneously film strip 16 is also advance to the next pair of negative images. Printing time is also decreased because motion of both negative and paper strips is controlled by acceleration and deceleration times. Because acceleration and deceleration occurs only once for every two images, further processing time is saved on advance of the negative and paper strips. The process is repeated for each set of two images. Parallel printing of two images results in a significant reduction in printing time. The summary of times needed for printing using prior art and new art is shown in Table 1.

TABLE 1

| PRIOR ART | NEW ART |
| --- | --- |
| accel. frame 1 | accel. |
| move frame 1 | move frame 1 |
| decel. frame 1 | move frame 2 |
| print frame 1 | decel. |
| accel. frame 2 | print (longer(tp1, tp2)) |
| move frame 2 | |
| decel. frame 2 | |
| print frame 2 | |

More than two images can be printed simultaneously. In another embodiment, two strips of negatives are processed side-by side on double width paper to print four images simultaneously. Four separate exposure stations are used to expose each of the four images.

Reference has been made to an embodiment that uses a common optic and illuminator. It is also possible to provide a separate illuminator and optic for each image being processed. The printing of multiple negatives occurring at the same time with separate illumination and optics improves printer throughput.

Figure 4:
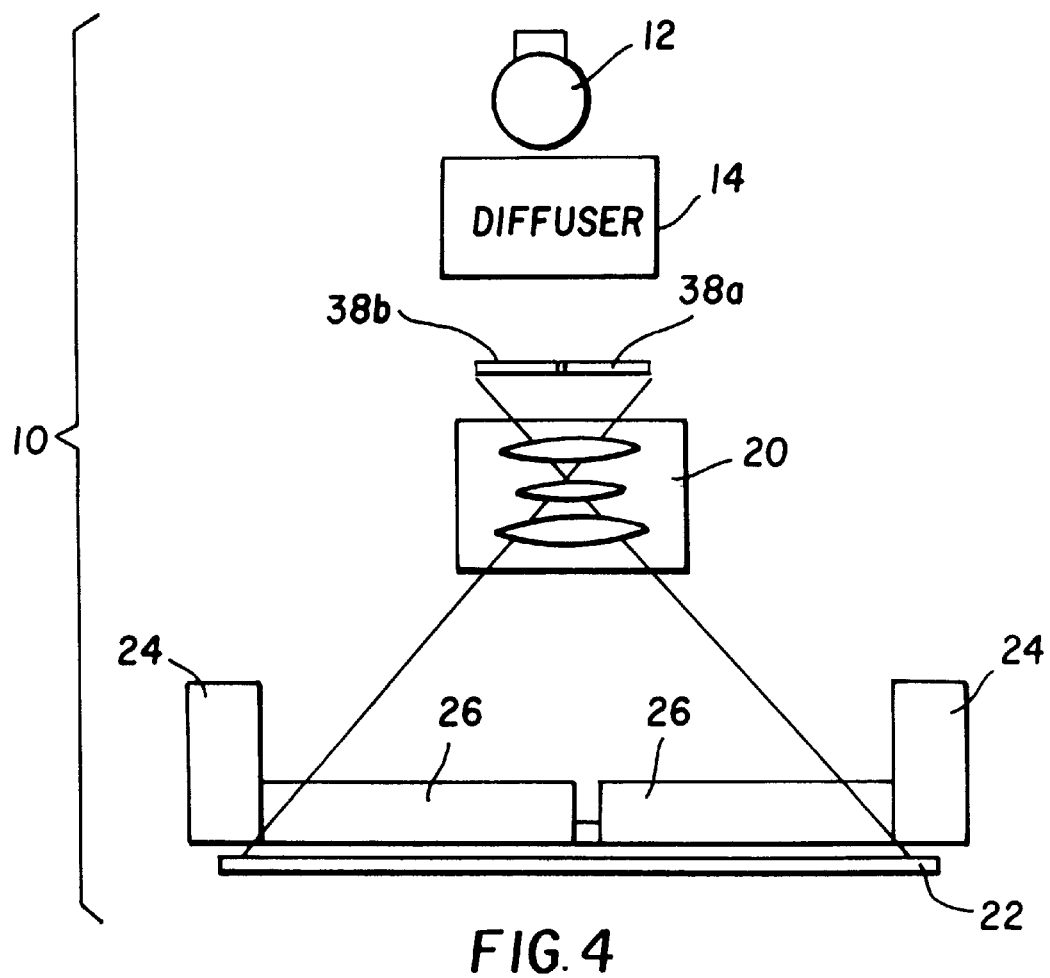
FIG. 4 is a front sectional view of another printing apparatus in accordance with the present invention which uses a display device that projects a plurality of images.

FIG. 4 shows another embodiment where the film strip is replaced by a color liquid crystal display 38. The liquid crystal display has a plurality of selectively energizable pixels that change in transmission density. Using the new art, two or more images are simultaneously loaded into the display and the print paper is advanced an equivalent number of printed image distances. After print paper 17 advances, the shutters according to the present invention simultaneously expose separate frames on the paper according to separate exposure schedules. Alternatively, the liquid crystal display acts as the shutter itself, shutting off separate colors as each pixel on the paper is properly exposure. The liquid crystal printer according to this invention will achieve a higher printing speed due to the double image printing and double image paper advance. Separate image exposure is also provided to optimize print quality.

The invention has been described in detail with particular reference to certain preferred embodiments thereof, but it will be understood that variations and modifications can be effected within the spirit and scope of the invention.

PARTS LIST 10 printer
12 lamp
14 diffuser
16 film strip
17 print paper
18a film images
18b film images
19a print images
19b print images
20 focusing optic
22 shutter support
24a shutter drives
24b shutter drives
26 shutters
30 processor
32 film scanner
34 film drive
36 paper drive
38 liquid crystal displays

What is claimed is:

1. Apparatus for simultaneously illuminating a plurality of images from a common film strip at an exposing gate onto different positions of a common printing paper, comprising:

a) means for transporting the common film strip having a plurality of images to the exposing gate wherein a plurality of images are to be illuminated;

b) illumination means for simultaneously illuminating at least two images from the common film strip in the exposing gate;

c) an optics system for focusing the illuminated film images onto separable areas of the common printing paper; and d) separate exposure control means for each image to be formed on the printing paper which are separately operable to control illumination of the film images.

2. The apparatus of claim 1 wherein said illumination means includes a unitary illuminator shared by all printed images.

3. The apparatus in claim 1 wherein the illumination means includes focusing optics for simultaneously projecting a plurality of images onto the paper.

4. The apparatus of claim 1 further including means for driving the printing paper to a printing position so that a plurality of images can be exposed thereon.

* * * * *